May 5, 1953 D. F. BALMER 2,637,562
STEPBACK MECHANISM FOR DICTATING MACHINE PLAYBACK ARMS
Filed March 15, 1951 2 SHEETS—SHEET 1

INVENTOR.
DONALD F. BALMER
BY
H. G. Manning
ATTORNEY

INVENTOR.
DONALD F. BALMER
BY
H. G. Manning
ATTORNEY

Patented May 5, 1953

2,637,562

UNITED STATES PATENT OFFICE 2,637,562

STEPBACK MECHANISM FOR DICTATING MACHINE PLAYBACK ARMS

Donald F. Balmer, East River, Madison, Conn., assignor to The Soundscriber Corporation, New Haven, Conn., a corporation of Connecticut Application March 15, 1951, Serial No. 215,698

5 Claims. (Cl. 274—14)

This invention relates to improvements in stepback mechanisms for sound reproduction apparatus and more particularly to a solenoid playback arm actuated stepback mechanism for combination recording and playback dictating machines utilizing disk records.

The present invention is especially designed for dictating machines of the type disclosed in the co-pending patent application Ser. No. 136,222, filed December 31, 1949, entitled Recording and Playback Arm Operating and Setting Means, by De Napoli and Runge.

In dictating machines of the above nature, it is often desirable for the transcribing typist to repeat a portion of the recorded dictation before typing it. Accordingly, the present invention has for its principal object the provision of an improved form of solenoid-operated stepback mechanism for back-spacing the pickup needle a short distance over the record without necessarily raising the needle from or stopping the rotation of the turntable.

A further object is to provide a stepback mechanism of the character described capable of stepping back a friction-fed, gear-driven playback arm.

A further object of this invention is to provide a stepback mechanism of the character described which, when actuated, back-steps the playback arm on the record the same number of grooves irrespective of the position of the stylus on the record.

A further object of this invention is to provide a stepback mechanism of the character described which may be actuated two or more times in rapid succession in order to accomplish greater amounts of stepback.

A further object of the invention is to provide a stepback mechanism of the character described which may readily be adjusted to control the amount of stepback.

A still further object of this invention is to provide an improved form of stepback mechanism of the above nature which will be relatively inexpensive to manufacture, simple in construction, compact, and very efficient and durable in use.

With these and other objects in view there has been illustrated on the accompanying drawings one form in which the invention may conveniently be embodied in practice.

Figure 1:
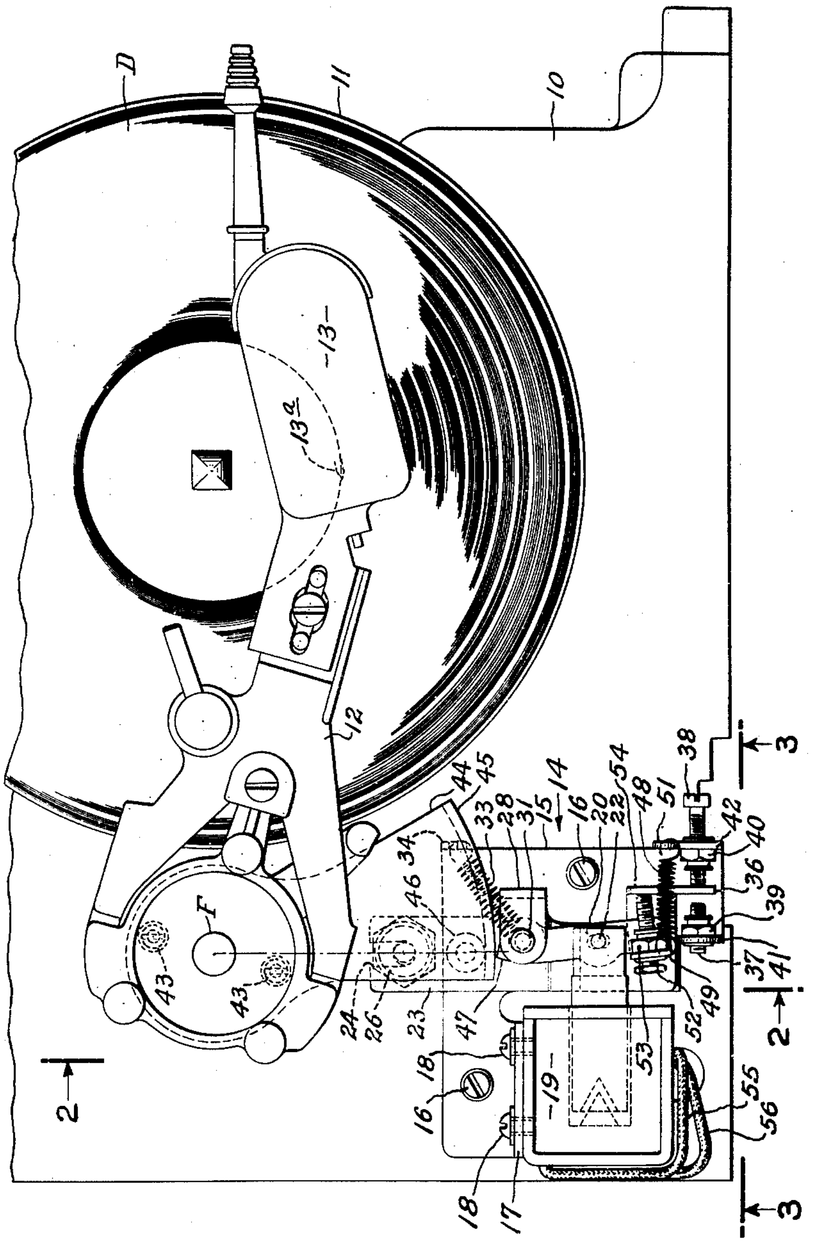
Fig. 1 is a partial plan view of the motor board showing the turntable transcriber arm and the stepback mechanism for controlling the same.

Referring now to the drawings, in which like reference numerals denote corresponding parts throughout the several views, the numeral 10 indicates a motor board base on which is supported a motor-driven turntable 11 having on it a recorded disk D. The playback arm 12 is furnished with the usual pickup head 13 having a groove-following stylus 13*a*, and is frictionally driven in synchronism with the turntable 11 through a vertical feed shaft F, partially shown in Fig. 2. Since the mechanical details of the turntable and playback arm drive mechanism are fully disclosed in the above referred to co-pending application, it is deemed unnecessary to duplicate their showing in the present application. For a complete knowledge of the present invention it need only be understood that the playback arm 12 is driven from a vertical drive shaft through a friction medium, but may be moved if desired by applying thereto sufficient force to overcome the friction. The present invention embraces the improved mechanism designed especially for overcoming this frictional force and accurately stepping back the playback any required predetermined distance.

The stepback mechanism embodying the present invention is designated generally by the numeral 14, and comprises a base plate 15, fixed against the lower left-hand corner of the motor board base 10 as by screws 16, said base plate having an integral horizontally upstanding bracket 17 against which is mounted, as by machine screws 18, a solenoid 19 operative to retract its associated plunger 20 when energized. The outer end of the plunger 20 is horizontally slotted to embrace the central portion of a dog member or clapper 21 pivoted therein as by the pivot pin 22.

Figure 2:
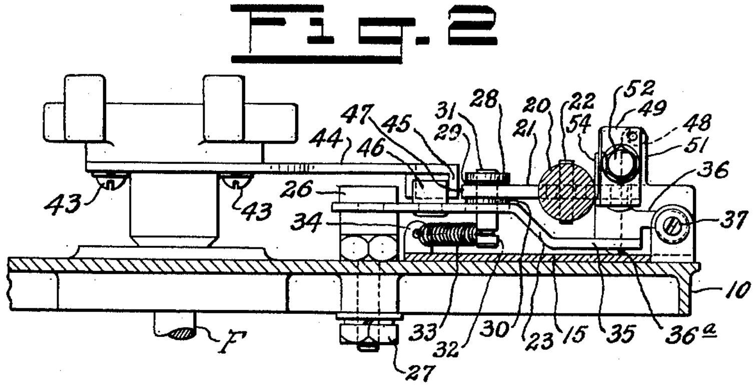
Fig. 2 is a cross sectional view taken along the broken line 2—2 of Fig. 1 looking in the direction of the arrows.
Figures 3, 4, 5:
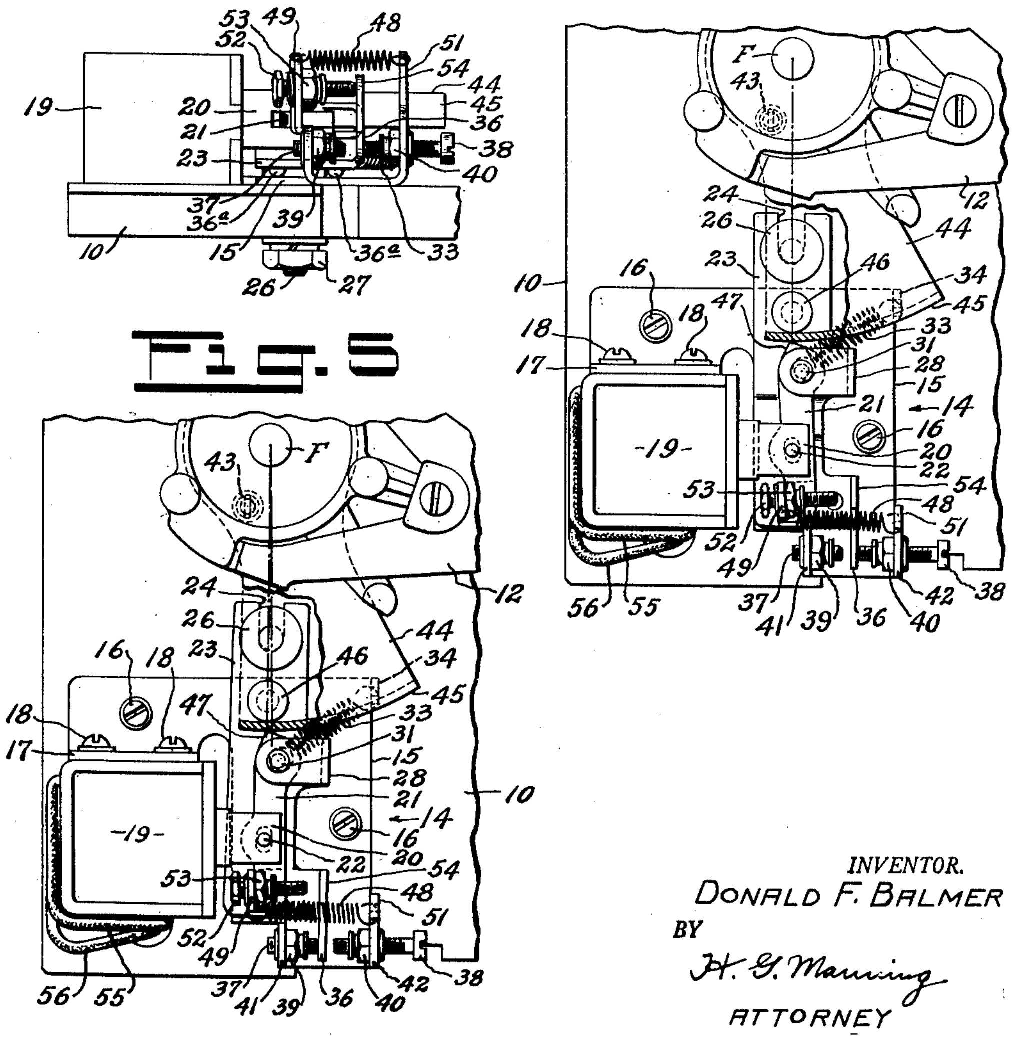
Fig. 3 is a side view of the stepback mechanism taken along the line 3—3 of Fig. 1.
Fig. 4 is a fragmentary plan view of the stepback mechanism, with a portion of the clutch sector arm broken away and showing the actuating solenoid plunger partially withdrawn.
Fig. 5 is a view, similar to Fig. 4 but showing the solenoid plunger and its associated clutch mechanism in fully actuated positions.

An elongated carrier member 23 is provided, said carrier member having a longitudinal slot 24 at its inner end fulcrumed within a circumferential groove 25 of a threaded pivot stud 26, affixed to the motor board base as by the nut 27 (Figs. 2 and 3). The central portion of the carrier member 23 is further provided with a bent-over portion 28 to form a carriage within which (spaced by the upper and lower washers 29, 30) the inner end of the dog member 21 is pivotally connected by a vertical connector pin 31, said pin being fixed between the upper and lower portions of said carriage.

The pin 31 has a downwardly extending portion 32 which is circumferentially grooved to serve as a connector for one end of the tension spring 33, the other end of which is connected to the upstanding lug 34 at the upper left-hand corner of the base plate 15 and integral therewith. The outer end portion 35 of the carrier 23 is downwardly offset and provided on its underside with rounded glider protrusions 35a (Figs. 2 and 3) to minimize frictional resistance between the carrier member 23 and the base plate 15.

In order to limit the pivotal motion of the carrier member 23 about the pivot stud 26, said carrier member is provided with an offset and outwardly extending stop portion 36 (Figs. 4 and 5) disposed between aligned left and right hand adjustable stop screws 37, 38 threaded in lock nuts 39, 40, the same being riveted in upstanding bracket portions 41, 42, integral with the base plate 15.

The playback arm 12 has fixed against its underside, as by machine screws 43 (Figs. 1 and 2) a flat sector plate 44 having a downwardly extending curved clutch rim 45, concentric with the pivotal axis of said playback arm. Closely adjacent the inner side of the clutch rim 45 is a cylindrical clutch anvil 46 riveted to and upstanding from the inner end portion of the carrier member 23.

In order to clutch the carrier member 23 to the playback arm 12 through the sector plate 44 for the transmission of the stepback motion thereto (upon energization of the solenoid 19), the dog member 21 is provided at its inner end with an offset, V-shaped, tooth edge 47 adapted to engage the outer side of the clutch rim 45 and clutch it against the anvil 46.

Means are provided, however, for the complete release of the sector plate 44 upon deenergization of the solenoid, said means comprising a tension spring 48 connected between the apertured upstanding bracket 49 riveted, as by a rivet 50, against the underside of the outer end of the dog member 21, and an upstanding apertured lug 51, integral with the base plate 15 and forming an extension of the bracket portion 42. Thus it will be evident that the dog member 21 is normally urged in a counter-clockwise or clutch-release direction.

Adjustable means is provided to limit the motion of the carrier 23 and the dog member 21 in the release position direction, said means comprising an adjustment screw 52 threaded in a lock nut 53, riveted in the bracket 49. The end of the adjustment screw 52 will abut against an upstanding stop portion 54 in alignment therewith, said stop portion being a coplanar extension of the stop portion 36 of the carrier member 23, as clearly shown in Fig. 1.

The use of the stepback mechanism will preferably be controlled by a foot-actuated, normally open-circuited switch (not shown), in series with the solenoid winding terminal wires 55, 56, and a suitable source of electrical power (not shown).

*Operation*

Referring to Fig. 1, which shows the stepback mechanism in unactuated or released position, it will be observed that the tooth edge 47 of the dog member 21 is slightly spaced from the clutch rim 45 in order to insure complete disengagement between the stepback mechanism and the playback arm. The amount of the spacing may readily be varied by adjustment of the screw 52 as hereinabove described.

Fig. 4 illustrates the stepback mechanism at its first stage of operation after the solenoid 19 has been energized. The plunger 20 is shown as having been partially retracted, during which movement it has turned the dog member 21 connected thereto about the connector pin 31 so that the tooth edge 47 is in biting engagement with the clutch rim 45 backed by the clutch anvil 46.

Fig. 5 illustrates the stepback mechanism after completion of its retraction stroke. It will be noted that the carrier member 23, the dog member 21, and the sector plate 44 have been retracted in unison during the second stage of the plunger stroke, thereby setting back the playback arm 12 an angular distance corresponding to the rotative motion of the sector plate 44 as indicated by the angular distance between the playback arm radii shown in dashed lines in Fig. 5. It will further be noted that the distance of the plunger retraction, and consequently the distance that the playback arm is stepped back, will be determined by the adjustment of the screw 37.

Upon open-circuiting the solenoid and consequential release of the stepback mechanism under the tensional forces of the coil springs 33, 48, the mechanism will again assume the normal dispostion of parts as shown in Fig. 1—the screw 38 serving as an adjustable stop for the carrier member 23. It will thus be apparent that the distance which the playback arm will be stepped back may selectively be determined by the setting of the adjustment screws 37, 38.

It will be noted that since the radius extending from the axis of rotation of the carrier member 23 to the tooth edge 47 is much less than the radius extending from the pivotal axis of the playback arm to said tooth edge, there will be a tendency for said tooth edge to more tightly grip the clutch rim 45 as it is retracted past alignment with said axis, thereby further insuring dependable clutching action for positive controlled stepback of the playback arm.

One advantage of the stepback mechanism herein disclosed resides in its capability of exerting a considerable amount of power, whereby a playback arm may be accurately stepped back against great frictional force.

Other advantages reside in its simplicity, adjustability, and dependability even after long periods of use.

While there has been disclosed in this specification one form in which the invention may be embodied it is to be understood that this form is shown for the purpose of illustration only and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a phonographic transcriber of the type having a reproducing arm pivotally mounted to swing across a rotating grooved disk record, a sector plate on said arm having an arcuate depending flange concentric with the pivotal axis of said arm, a rigid cylindrical anvil located between said flange and said axis, a movable clapper lever having a knife edge located adjacent the other side of said flange and electromagnetic means connected to said clapper lever to cause said knife edge to bitingly engage said flange and press it against said anvil and subsequently, swing said sector plate to step back said playback arm with respect to the grooves of said record.

2. The invention as defined in claim 1, in which provision is made of a pivotally mounted adjustable carrier member upon which said anvil member is rigidly mounted and providing a fulcrum for said clapper lever.

3. The invention as defined in claim 2 in which said fulcrum is located closely adjacent said arcuate flange to cause said knife edge to engage said flange with a strong force.

4. The invention as defined in claim 1 in which resilient means are provided for normally holding said knife edge out of clutching engagement with said arcuate flange.

5. The invention as defined in claim 2, in which adjustable stop members are provided to limit the motion of said clapper lever and said carrier member.

DONALD F. BALMER.

References Cited in the file of this patent

UNITED STATES PATENTS

| Number | Name | Date |
|---|---|---|
| 1,438,000 | Underhill | Dec. 5, 1922 |
| 2,323,257 | Thompson | June 29, 1943 |
| 2,489,045 | Nakken | Nov. 22, 1949 |